United States Patent
Jung et al.

(10) Patent No.: US 11,102,824 B2
(45) Date of Patent: Aug. 24, 2021

(54) METHOD AND APPARATUS FOR AVOIDING SIGNAL COLLISION BY ENHANCED DISTRIBUTED COORDINATION ACCESS IN WIRELESS LOCAL ACCESS NETWORK

(71) Applicants: Hyundai Motor Company, Seoul (KR); Kia Motors Corporation, Seoul (KR); Industry-University Cooperation Foundation Hanyang University, Seoul (KR)

(72) Inventors: Hyo Jin Jung, Gyeonggi-do (KR); Sang Sun Lee, Seoul (KR); Sung Chul Pyo, Seoul (KR)

(73) Assignees: Hyundai Motor Company, Seoul (KR); Kia Motors Corporation, Seoul (KR); Industry-University Cooperation Foundation Hanyang University, Seoul (KR)

( * ) Notice: Subject to any disclaimer, the term of this patent is extended or adjusted under 35 U.S.C. 154(b) by 65 days.

(21) Appl. No.: 16/673,449

(22) Filed: Nov. 4, 2019

(65) Prior Publication Data
US 2020/0146060 A1    May 7, 2020

(30) Foreign Application Priority Data

Nov. 5, 2018 (KR) .................. 10-2018-0134491
Oct. 4, 2019 (KR) .................. 10-2019-0122872

(51) Int. Cl.
*H04W 74/08* (2009.01)
*H04W 4/40* (2018.01)
*H04W 72/04* (2009.01)
*H04W 84/12* (2009.01)

(52) U.S. Cl.
CPC .......... *H04W 74/085* (2013.01); *H04W 4/40* (2018.02); *H04W 72/0446* (2013.01); *H04W 84/12* (2013.01)

(58) Field of Classification Search
CPC .......... H04W 4/40; H04W 4/44; H04W 4/46; H04W 72/0446; H04W 74/004; H04W 74/0816; H04W 74/085; H04W 84/12
See application file for complete search history.

(56) References Cited

U.S. PATENT DOCUMENTS

| | | | |
|---|---|---|---|
| 9,565,705 B2* | 2/2017 | Noh | H04W 74/0858 |
| 2015/0156662 A1* | 6/2015 | Bai | H04W 28/0236 370/231 |
| 2017/0238270 A1* | 8/2017 | Shen | H04W 56/00 370/336 |

(Continued)

*Primary Examiner* — Kashif Siddiqui
(74) *Attorney, Agent, or Firm* — Mintz Levin Cohn Ferris Glovsky and Popeo, P.C.; Peter F. Corless

(57) ABSTRACT

An operation method of a first communication node for transmitting a message in a vehicle-to-everything (V2X) communication network is provided. The method includes receiving information regarding a time period including a plurality of transmission slots from a second communication node and selecting one transmission slot included in the time period based on a first index configured based on the information regarding the time period. A message is transmitted through the one transmission slot and the information regarding the time period includes information regarding a number of the plurality of transmission slots included in the time period.

15 Claims, 11 Drawing Sheets

(56) References Cited

U.S. PATENT DOCUMENTS

| | | | |
|---|---|---|---|
| 2019/0044738 A1* | 2/2019 | Liu | H04W 4/46 |
| 2019/0297622 A1* | 9/2019 | Noh | H04L 5/0053 |
| 2019/0349802 A1* | 11/2019 | Weinfield | H04W 52/243 |
| 2019/0349874 A1* | 11/2019 | Baek | H04W 56/002 |
| 2019/0364484 A1* | 11/2019 | Kim | H04W 28/06 |
| 2019/0379548 A1* | 12/2019 | Barrett | H04W 4/40 |
| 2019/0387379 A1* | 12/2019 | Sugiyama | H04W 72/0406 |
| 2019/0387522 A1* | 12/2019 | Borst | H04W 72/0446 |
| 2021/0014656 A1* | 1/2021 | Mueck | H04W 74/0816 |

* cited by examiner

METHOD AND APPARATUS FOR AVOIDING SIGNAL COLLISION BY ENHANCED DISTRIBUTED COORDINATION ACCESS IN WIRELESS LOCAL ACCESS NETWORK

CROSS-REFERENCE TO RELATED APPLICATIONS

This application claims priority to Korean Patent Applications No. 10-2018-0134491 filed on Nov. 5, 2018 and No. 10-2019-0122872 filed on Oct. 4, 2019 in the Korean Intellectual Property Office (KIPO), the entire contents of which are hereby incorporated by reference.

BACKGROUND

1. Technical Field

The present disclosure relates to methods for transmitting signals in a wireless local area network (WLAN), and more particularly to methods for avoiding collision between signals by performing an enhanced distributed coordination access (EDCA) operation based on indexes of transmission slots included in a time period.

2. Related Art

Recently, with the spread of mobile devices, wireless local area network (WLAN) technology, which provides fast wireless Internet service, is being developed. The WLAN technology enables mobile devices such as smart phones, smart pads, laptop computers, portable multimedia players, embedded devices, and the like to wirelessly connect to the Internet based on wireless communication technology at a short range.

Early WLAN technology used a 2.4 GHz frequency band through Institute of Electrical and Electronics Engineers (IEEE) 802.11 to support a rate of 1 to 2 Mbps based on frequency hopping, spread spectrum, infrared communication, and the like. Recently, orthogonal frequency division multiplex (OFDM) scheme is applied to support a rate of up to 54 Mbps. In addition, the IEEE 802.11 is realizing or developing standards for various technologies such as Quality of Service (QoS) enhancement, access point (AP) protocol compatibility, security enhancement, radio resource measurement, wireless access vehicular environment (WAVE), fast roaming, mesh network, interworking with external networks, and wireless network management.

Among various IEEE 802.11 standards, IEEE 802.11b supports a communication rate of up to 11 Mbps using the 2.4 GHz frequency band. IEEE 802.11a, commercialized after the IEEE 802.11b, reduced impact of interferences compared to the congested 2.4 GHz frequency band by using a 5 GHz frequency band instead of the 2.4 GHz frequency band, and improved the communication rate to the maximum of 54 Mbps by using the OFDM technology. However, the IEEE 802.11a has a shorter communication range than the IEEE 802.11b. Additionally, IEEE 802.11g, like the IEEE 802.11b, uses the 2.4 GHz frequency band to realize a communication rate of up to 54 Mbps. The EEE802.11g has received considerable attention according to its backward compatibility, which is superior to the IEEE 802.11a also in aspect of a communication range.

In addition, IEEE 802.11n is a technical standard established to overcome the limitation on the communication rate, which has been pointed out as a weak point of the WLAN. The IEEE 802.11n aims to increase the speed and reliability of network and to extend the operating range of wireless networks. More specifically, the IEEE 802.11n supports high throughput (HT) with a data throughput of up to 540 Mbps and is based on Multiple Inputs and Multiple Outputs (MIMO) technology which uses multiple antennas at both a transmitter side and a receiver side to minimize transmission errors and optimize data rates. Additionally, this standard uses a coding scheme of transmitting multiple duplicate copies to increase data reliability, and may also use the OFDM to increase a transmission speed.

As the spread of WLAN is activated and applications are diversified, there was a need for new WLAN systems to support a very high throughput (VHT) compared to the data throughput supported by the IEEE 802.11n. Among such the new WLAN systems, IEEE 802.11ac supports a wide bandwidth (80 MHz to 160 MHz) at the 5 GHz frequency band. The IEEE 802.11ac standard is defined only in the 5 GHz frequency band, but for backward compatibility with products supporting the existing 2.4 GHz frequency band, early IEEE 802.11ac chipsets also support operations in the 2.4 GHz frequency band.

Particularly, the IEEE 802.11ac supports a bandwidth of up to 40 MHz at the 2.4 GHz frequency band. Theoretically, according to this standard, a WLAN speed of a multiple link terminal may be at least 1 Gbps, and a maximum single link speed may be at least 500 Mbps. This is accomplished by extending the concept of wireless interfaces adopted by the IEEE 802.11n, such as wider radio frequency bandwidth (up to 160 MHz), more MIMO spatial streams (up to eight), multi-user MIMO, and higher density modulation (up to 256 QAM). In addition, there is IEEE 802.11ad as a scheme of transmitting data using a 60 GHz frequency band instead of the existing 2.5 GHz/5 GHz bands. The IEEE 802.11ad is a transmission standard that provides a communication rate up to 7 Gbps using beamforming technology, and is suitable for large amounts of data or high bitrate video streaming such as uncompressed HD video. However, the 60 GHz frequency band is difficult to pass through obstacles, and thus can be used only between devices in a short range.

The WLAN may use a wide frequency band. In order to use a wide frequency band, a station checks whether there is an available band for a certain period of time before transmitting data, and uses a wide frequency band by concatenating an adjacent frequency band based on whether the adjacent frequency band is available. For example, when a 20 MHz band is a primary frequency band (main channel), a 20 MHz band (i.e., first adjacent band) adjacent to the primary frequency band is available, a 20 MHz band (i.e., second adjacent band) adjacent to the first adjacent band is unavailable, and a 20 MHz band (i.e., third adjacent channel) adjacent to the second adjacent band is available, data may be transmitted using a total of 40 MHz as a transmission band since the third adjacent channel is not contiguous with the main channel).

In other words, since only the contiguous frequency bands are used as a data transmission band, an actual available frequency band is unable to be used. Additionally, the conventional radio access technology supports only one-to-one connection composed of one transmitting terminal and one receiving terminal for each transmission attempt within the same basic service set (BSS), and thus is inefficient since it does not reflect the connection environment or transmission data characteristics of the terminals.

Further, WAVE communication is a standard technology defined by IEEE 802.11p and IEEE 1609.x. In a media access control (MAC) layer of the WAVE communication, a carrier sensing medium access/collision avoidance (CSMA/

CA) based distributed coordination function (DCF) and an enhanced distributed channel access (EDCA) for supporting quality of service (QoS) are used. Each channel in a MAC layer may have one of four access categories (ACs) having different EDCA parameters (AIFSN, $Cw_{min}$, $Cw_{max}$, TXOP) according to data characteristics. In the general MAC structure, the WAVE communication can support the EDCA based on the DCF.

However, unlike the general WLAN communication environment, vehicles are nodes moving along a specific road, and thus a situation in which the density of the vehicles increases considerably in a specific area such as a city center and an intersection. V2X traffic may increase due to the increase in the density of the vehicles and the increase in packets due to V2X service, and collision between wireless signals may occur, thereby increasing channel congestion. As a result, packet loss and delay may occur, making it difficult for the V2X service to function smoothly.

SUMMARY

Accordingly, exemplary embodiments of the present disclosure provide an operation method of a communication node for avoiding collision between signals by performing an EDCA operation in a transmission slot determined based on an index among indexes which respectively indicate transmission slots.

According to exemplary embodiments of the present disclosure, an operation method of a first communication node for transmitting a message in a V2X communication network may include receiving information regarding a time period including a plurality of transmission slots from a second communication node; selecting one transmission slot included in the time period based on a first index configured based on the information regarding the time period; and transmitting a message through the one transmission slot. The information regarding the time period may include information regarding a number of the plurality of transmission slots included in the time period.

The number of the plurality of transmission slots included in the time period may be configured based on at least one of a number of communication nodes located within a preconfigured distance from the second communication node, a data transmission rate of the message, and a number of messages transmitted during the time period. The receiving of the information may include receiving a wireless access for vehicle environment (WAVE) service advertisement (WSA) including the information regarding the time period through a control channel (CCH).

The selecting of the one transmission slot may include detecting a collision between messages in the transmission slot indicated by the first index by performing a carrier sense multiple access/collision avoidance (CSMA/CA) operation in the transmission slot indicated by the first index. The selecting of the one transmission slot may further include, when the collision is detected as a result of the CSMA/CA operation, reconfiguring a second index except the first index. The selecting of the one transmission slot may further include, when a number of performing the reconfiguring of the second index exceeds a preconfigured threshold, changing a channel access mode of the time period.

The transmitting of the message may further include, when the transmission of the message is completed in the one transmission slot, maintaining the first index of the one transmission slot after transmitting the message through the one transmission slot. Additionally, the transmitting of the message may further include, when the one transmission slot is terminated before the transmission of the message is completed, transmitting the message additionally through a transmission slot after the one transmission slot.

Furthermore, in accordance with exemplary embodiments of the present disclosure, a second communication node for transmitting a message in a V2X communication network may include a processor; a memory configured to store at least one instruction executable by the processor; and at least one antenna configured to perform signal transmission and reception based on an operation of the processor. Additionally, when executed by the processor, the at least one instruction may be configured to generate information regarding transmission slots for granting transmission opportunities to first communication nodes; generate information regarding a time period including a plurality of transmission slots based on the information regarding the transmission slots; and transmit a message including the information regarding the time period to the first communication nodes. The information regarding the time period includes information regarding a number of the plurality of transmission slots included in the time period.

The second communication node may be a road side unit (RSU), and the first communication nodes may be on board units (OBUs). The number of the plurality of transmission slots included in the time period may be configured based on at least one of a number of the first communication nodes located within a preconfigured distance from the second communication node, a data transmission rate of messages transmitted by the first communication nodes, and a number of messages transmitted by the first communication nodes during the time period. The at least one instruction may be further configured to transmit a wireless access for vehicle environment (WAVE) service advertisement (WSA) including the information regarding the time period through a control channel (CCH).

Furthermore, in accordance with exemplary embodiments of the present disclosure, a first communication node for transmitting a message in a V2X communication network may include a processor; a memory configured to store at least one instruction executable by the processor; and at least one antenna performing signal transmission and reception based on operation of the processor. Additionally, when executed by the processor, the at least one instruction may be configured to receive information regarding a time period including a plurality of transmission slots from a second communication node; select one transmission slot included in the time period based on a first index configured based on the information regarding the time period; and transmit a message through the one transmission slot. The information regarding the time period may include information regarding a number of the plurality of transmission slots included in the time period.

The number of the plurality of transmission slots included in the time period may be configured based on at least one of a number of communication nodes located within a preconfigured distance from the second communication node, a data transmission rate of the message, and a number of messages transmitted during the time period. The at least one instruction may be further configured to receive a wireless access for vehicle environment (WAVE) service advertisement (WSA) including the information regarding the time period through a control channel (CCH).

The at least one instruction may be further configured to detect a collision between messages in the transmission slot indicated by the first index by performing a carrier sense multiple access/collision avoidance (CSMA/CA) operation in the transmission slot indicated by the first index. The at least one instruction may be further configured to, when the collision is detected as a result of the CSMA/CA operation, reconfigure a second index except the first index.

Further, the at least one instruction may be further configured to, when a number of performing the reconfiguring of the second index exceeds a preconfigured threshold, change a channel access mode of the time period and when the transmission of the message is completed in the one transmission slot, maintain the first index of the one transmission slot after transmitting the message through the one transmission slot. The at least one instruction may be further configured to, when the one transmission slot is terminated before the transmission of the message is completed, transmit the message additionally through a transmission slot after the one transmission slot.

According to the exemplary embodiments of the present disclosure, an on-board unit (OBU) attempting channel access may select one transmission slot among transmission slots included in a sync interval based on an index, thereby effectively avoiding collision between messages generated by OBUs in a V2X communication network.

BRIEF DESCRIPTION OF DRAWINGS

Exemplary embodiments of the present disclosure will become more apparent by describing in detail exemplary embodiments of the present disclosure with reference to the accompanying drawings, in which.

DETAILED DESCRIPTION

Figure 1:
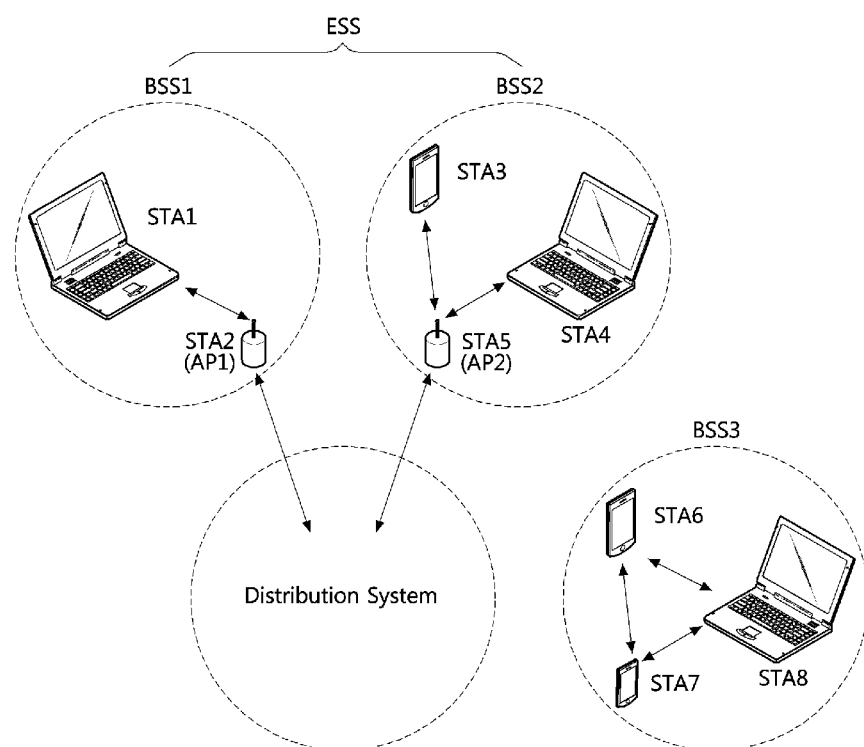
FIG. 1 is a conceptual diagram illustrating a first exemplary embodiment of a WLAN system.

Hereinafter, exemplary embodiments of the present disclosure will be described in detail with reference to the accompanying drawings. As those skilled in the art would realize, the described exemplary embodiments may be modified in various different ways, all without departing from the spirit or scope of the present disclosure. Further, throughout the specification, like reference numerals refer to like elements.

The terminology used herein is for the purpose of describing particular forms only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although forms are described herein as using a plurality of units to perform the exemplary process, it is understood that the exemplary processes may also be performed by one or plurality of modules. Additionally, it is understood that a controller/controller unit/control unit may perform one or more of the processes described further below, and the term controller/controller unit/control unit refers to a hardware device that includes a memory and a processor. The memory is configured to store the modules, and the processor is specifically configured to execute said modules to perform one or more processes which are described further below. Moreover, it is understood that the units or modules described herein may embody a controller/controller unit/control unit for controlling operation of the unit or module.

Furthermore, control logic of the present disclosure may be embodied as non-transitory computer readable media on a computer readable medium containing executable program instructions executed by a processor, controller/control unit or the like. Examples of the computer readable mediums include, but are not limited to, read-only memory (ROM), random access memory (RAM), compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Since the present disclosure may be variously modified and have several forms, specific embodiments will be shown in the accompanying drawings and be described in detail in the detailed description. It should be understood, however, that it is not intended to limit the present disclosure to the specific embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without being departed from the scope of the present disclosure and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which this disclosure belongs. Terms such as terms that are generally used and have been in dictionaries should be construed as having meanings matched with contextual meanings in the art. In this description, unless defined clearly, terms are not ideally, excessively construed as formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

A communication system (e.g., a WLAN system) to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. The communication system may be used in the same sense as the communication network.

FIG. 1 is a conceptual diagram illustrating a first exemplary embodiment of a WLAN system. As shown in FIG. 1, a WLAN system may include at least one basic service set (BSS). The BSS denotes a set of STAs (e.g., STA1, STA2 (i.e., AP1), STA3, STA4, and STA5 (i.e., AP2), STA6, STAT, and STAB) configured to communicate with each other through successful synchronization, and is not a concept that denotes a specific area. In exemplary embodiments below, a station that performs a function of an access point may be referred to as an 'access point (AP)', and a station that does not perform the function of an access point may be referred to as a 'non-AP station' or simply 'station'.

The BSSs may be classified as infrastructure BSSs and independent BSSs (IBSSs). In particular, a BSS1 and a BSS2 may be infrastructure BSSs, and a BSS3 may be an IBSS. The BSS1 may include the station STA1, the access point STA2 (i.e., AP1) that provides a distribution service, and a distribution system (DS) that connects the plurality of access points STA2 (i.e., AP1) and STA5 (i.e., AP2). In the BSS1, the access point STA2 (i.e., AP1) may manage the STA1.

The BSS2 may include the STA3 and the STA4, the access point STA5 (i.e., AP2) that provides the distribution service, and the distribution system that connects the plurality of access points STA2 (i.e., AP1) and STA5 (i.e., AP 2). In the BSS2, the access point STA5 (i.e., AP2) may manage the STA3 and the STA4. The BSS3 may be an IBSS operating in an ad-hoc mode. In the BSS3, there is no AP which is an entity that performs a management function at a center. In other words, in the BSS3, the stations STA6, STA7, and STA8 may be managed in a distributed manner. In the BSS3, all the stations STA6, STA7, and STA8 may be mobile stations and may be not allowed to connect to the DS, thus forming a self-contained network.

The access points STA2 (i.e., AP1) and STA5 (i.e., AP2) may provide access to the DS via a wireless medium for the stations STA1, STA3, and STA4 connected thereto. Communications between the stations STA1, STA3, and STA4 in the BSS 1 or the BSS2 may be generally performed through the access points STA2 (i.e., AP1) and STA5 (i.e., AP2), but when a direct link is established, direct communications between the stations STA1, STA3, and STA4 are also possible.

A plurality of infrastructure BSSs may be interconnected via a DS. A plurality of BSSs connected through a DS is referred to as an extended service set (ESS). The stations (e.g., STA1, STA2 (i.e., AP1), STA3, STA4, and STA5 (i.e., AP2)) included in an ESS may be configured to communicate with each other, and a station (e.g., STA1, STA3, or STA4) in the ESS may move from one BSS to another BSS while performing seamless communication.

The DS is a mechanism for an AP to communicate with another AP, in which the AP may be configured to transmit a frame for stations connected to a BSS managed by the AP or may be configured to transmit a frame for an arbitrary station having moved to another BSS. Additionally, the AP may be configured to exchange frames with an external network, such as a wired network. The DS is not necessarily a network, and may have any form capable of providing a predetermined distribution service defined in an IEEE 802.11 standard. For example, a DS may be a wireless network, such as a mesh network, or a physical structure that connects APs with each other. Each of the communication nodes STA1, STA2 (i.e., AP1), STA3, STA4, STA5 (i.e., AP2), STA6, STAT, and STA8 included in the WLAN system may be configured as follows.

Figure 2:
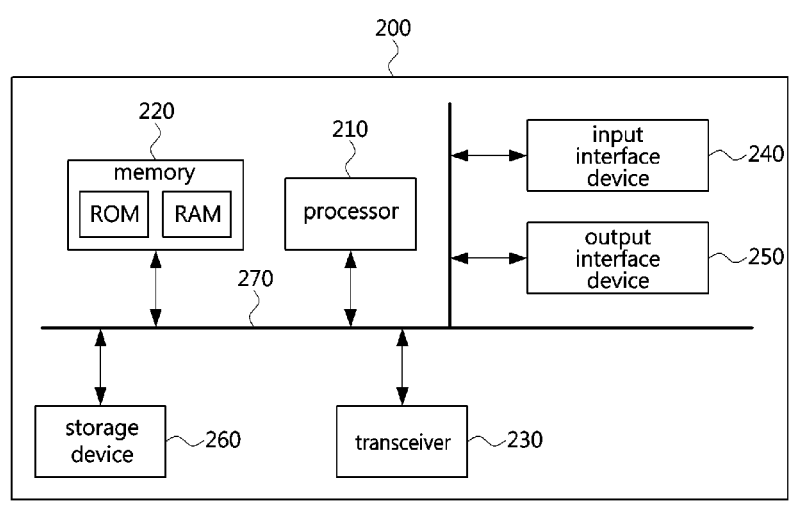
FIG. 2 is a block diagram illustrating an exemplary embodiment of a communication node constituting a WLAN system.

FIG. 2 is a block diagram illustrating an exemplary embodiment of a communication node constituting a WLAN system. As shown in FIG. 2, a communication node 200 may include at least one processor 210, a memory 220, and a transceiver 230 connected to a network for performing communications. The transceiver 230 may also be referred to as a 'radio frequency (RF) unit', 'RF module', or the like. Additionally, the communication node 200 may further include an input interface device 240, an output interface device 250, a storage device 260, and the like. Each component included in the communication node 200 may be configured to communicate with each other as connected via a bus 270.

However, each of the components included in the communication node 200 may be connected to the processor 210 via a separate interface or a separate bus rather than the common bus 270. For example, the processor 210 may be connected to at least one of the memory 220, the transceiver 230, the input interface device 240, the output interface device 250, and the storage device 260 via a dedicated interface.

The processor 210 may be configured to execute at least one instruction stored in at least one of the memory 220 and the storage device 260. The processor 210 may refer to a central processing unit (CPU), a graphics processing unit (GPU), or a dedicated processor on which methods in accordance with exemplary embodiments of the present disclosure are performed. Each of the memory 220 and the storage device 260 may include at least one of a volatile storage medium and a non-volatile storage medium. For example, the memory 220 may include at least one of read-only memory (ROM) and random access memory (RAM).

Figure 3:
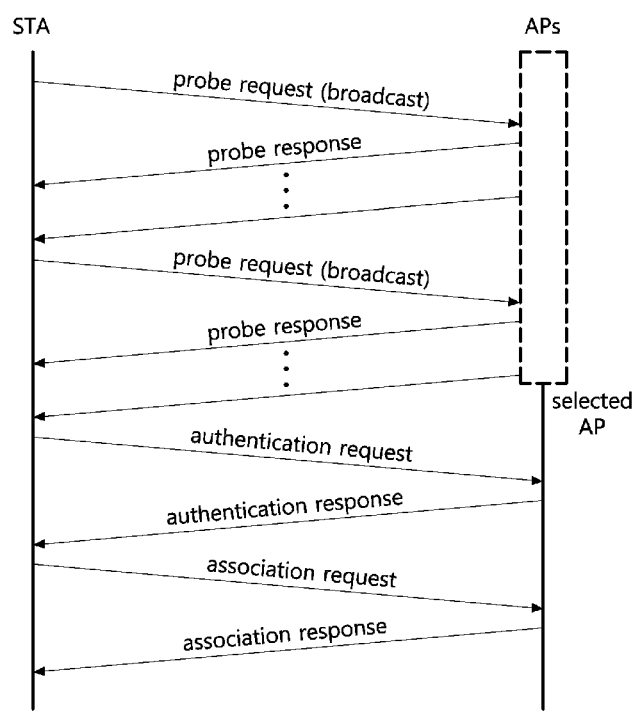
FIG. 3 is a sequence chart illustrating an association procedure of a station in a WLAN system according to an exemplary embodiment.

Meanwhile, in the WLAN system, an association procedure may be performed as follows. FIG. 3 is a sequence chart illustrating an association procedure of a station in a WLAN system. As shown in FIG. 3, an association procedure of a station STA in an infrastructure BSS may generally be divided into a probe step of probing an AP, an authentication step for authentication with the probed AP, and an association step of associating with the authenticated AP.

The station STA may be configured to first probe neighboring APs through a probe process. The probe process may be performed in a passive scanning scheme or an active scanning scheme. The passive scanning scheme may be performed by overhearing beacons transmitted by the neighboring APs. On the other hand, the active scanning scheme may be performed by broadcasting a probe request frame. The APs receiving the probe request frame may be configured to transmit probe response frames that correspond to the probe request frame to the station STA. The station STA may be configured to recognize the presence of the neighboring APs by receiving the probe response frames.

Subsequently, the station STA may be configured to perform an authentication with a probed AP, and perform an authentication with the plurality of probed APs. Authentication algorithms conforming to an IEEE 802.11 standard are classified as an open system algorithm for exchanging two authentication frames and a shared key algorithm for exchanging four authentication frames. Through a process of exchanging an authentication request frame and an authentication response frame based on such authentication algorithms according to an IEEE 802.1 standard, the station STA may be configured to complete an authentication with an AP.

When authentication with the access point (AP) is completed, the station STA may be configured to perform an association step with the access point (AP). In particular, the station STA may be configured to select one access point AP among the access points APs which have performed the authentication step with itself, and perform the association step with the selected access point AP. In other words, the station STA may be configured to transmit an association request frame to the selected AP and receive an association response frame that is a response to the association request frame from the selected AP, and thus, the association with the selected AP may be completed.

Meanwhile, a communication node (e.g., an access point, a station, etc.) belonging to the WLAN system may be configured to perform transmission and reception of a frame based on a point coordination function (PCF), a hybrid coordination function (HCF), an HCF controlled channel access (HCCA), a distributed coordination function (DCF), and/or an enhanced distributed channel access (EDCA).

The frame in the WLAN system may be classified into a management frame, a control frame, and a data frame. The management frame may be classified into an association request frame, an association response frame, a reassociation request frame, a reassociation response frame, a probe request frame, a probe response frame, a beacon frame, and an association. It may include a disassociation frame, an authentication frame, a deauthentication frame, an action frame, and the like.

The control frame may be classified into an acknowledgment (ACK) frame, a block ACK request (BAR) frame, a block ACK (BA) frame, a power saving (PS)-Poll frame, a request-to-send (RTS) frame, a clear-to-send (CTS) frame, and the like. The data frame may be classified into a quality of service (QoS) data frame and a non-QoS data frames. The QoS data frame may indicate a data frame for which transmission according to QoS is required, and the non-QoS data frame may indicate a data frame for which transmission according to QoS is not required.

Figure 4:
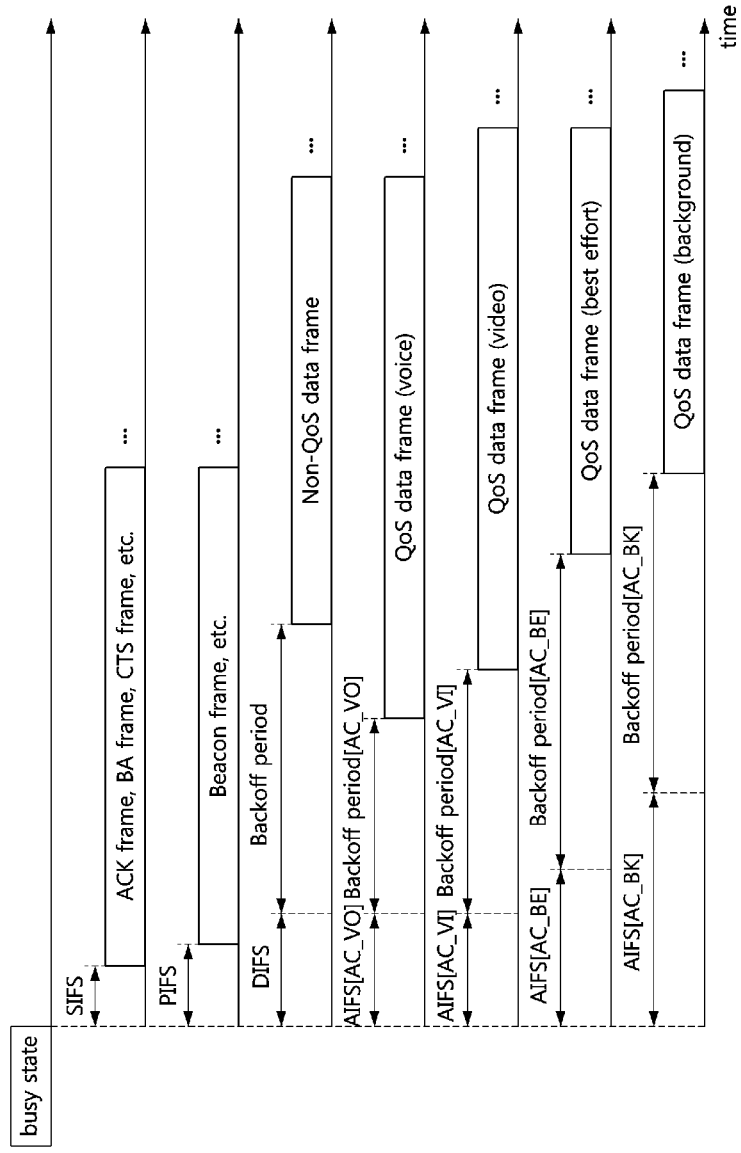
FIG. 4 is a timing diagram illustrating a first exemplary embodiment of an operation method of a communication node based on an EDCA.

Meanwhile, in the WLAN system, a communication node (e.g., an access point or a station) may be configured to operate based on the EDCA. FIG. 4 is a timing diagram illustrating a first exemplary embodiment of an operation method of a communication node based on an EDCA.

As shown in FIG. 4, a communication node that wants to transmit a control frame (or a management frame) may be configured to perform a monitoring operation (e.g., carrier sensing operation) on a channel state during a predetermined period (e.g., a short interframe space (SIFS) or a PCF IFS (PIFS)). When the channel state is determined to be an idle state during the predetermined period (e.g., SIFS or PIFS), the communication node may be configured to transmit a control frame (or a management frame). For example, the communication node may be configured to transmit an ACK frame, a BA frame, a CTS frame, or the like when the channel state is determined to be an idle state during an SIFS.

Additionally, the communication node (e.g., AP) may be configured to transmit a beacon frame or the like when the channel state is determined to be an idle state during a PIFS. When the channel state is determined to be busy during the predetermined period (e.g., SIFS or PIFS), the communication node may not transmit a control frame (or a management frame). In particular, the carrier sensing operation may be referred to as a 'clear channel assessment (CCA) operation'.

A communication node that wants to (e.g., intends to) transmit a non-QoS data frame may be configured to perform a monitoring operation (e.g., carrier sensing operation) on a channel state during a DCF IFS (DIFS). When the channel state is determined to be idle during a DIFS, the communication node may be configured to perform a random backoff procedure. For example, the communication node may be configured to select a backoff value (e.g., backoff counter) within a contention window based on the random backoff procedure, and perform the monitoring operation (e.g., carrier sensing operation) during a period that corresponds to the selected backoff value. The communication node may be configured to transmit a non-QoS data frame when the channel state is determined to be an idle state during the backoff period.

A communication node intending to transmit a QoS data frame may be configured to perform a monitoring operation (e.g., carrier sensing operation) on a channel state during an arbitration IFS (AIFS). When the channel state is determined to be idle during an AIFS, the communication node may be configured to perform a random backoff procedure. The AIFS may be set based on an access category (AC) of a data unit (e.g., a protocol data unit (PDU)) included in the QoS data frame. The AC of the data unit may be as shown in Table 1 below.

TABLE 1

| Priority | AC | Description |
| --- | --- | --- |
| Lowest | AC_BK | Background |
| . | AC_BE | Best effort |
| . | AC_VI | Video |
| . | AC_VO | Voice |
| Highest | | |

As shown in Table 1, AC_BK may indicate background data, AC_BE may indicate data transmitted in a best effort manner, AC_VI may indicate video data, and AC_VO may indicate voice data. For example, the length of the AIFS for the QoS data frame corresponding to each of AC_VO and AC_VI may be set equal to the length of the DIFS. The length of the AIFS for the QoS data frame corresponding to AC_BE and AC_BK may be set longer than the length of the DIFS. The length of the AIFS for the QoS data frame corresponding to AC_BK may be set longer than the length of the AIFS for the QoS data frame corresponding to AC_BE.

In the random backoff procedure, the communication node may be configured to select a backoff value (e.g., backoff counter) within a contention window based on the AC of the QoS data frame. The contention window based on the AC may be as shown in Table 2 below. As shown below, $CW_{min}$ may indicate the minimum value of the contention window, $CW_{max}$ may indicate the maximum value of the contention window, and each of the minimum and maximum values of the contention window may be expressed by the number of slots.

TABLE 2

| AC | $CW_{min}$ | $CW_{max}$ |
| --- | --- | --- |
| AC_BK | 31 | 1023 |
| AC_BE | 31 | 1023 |
| AC_VI | 15 | 31 |
| AC_VO | 7 | 15 |

The communication node may be configured to perform a monitoring operation (e.g., carrier sensing operation) on the channel state during a backoff period, and transmit the QoS data frame when the channel state is determined to be in an idle state during the backoff period.

Hereinafter, operation methods of a communication node according to exemplary embodiments of the present disclosure will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. In other words, when an operation of a non-AP station is described, the corresponding AP may be configured to perform an operation that corresponds to the operation of the non-AP station. Conversely, when an operation of the AP is described, the corresponding non-AP station may be configured to perform an operation that corresponds to the operation of the AP.

In the following, a wireless communication network to which exemplary embodiments according to the present disclosure are applied will be described. The wireless communication network to which the exemplary embodiments according to the present disclosure are applied is not limited to the contents described below, and the exemplary embodiments according to the present disclosure may be applied to various wireless communication networks.

Figure 5:
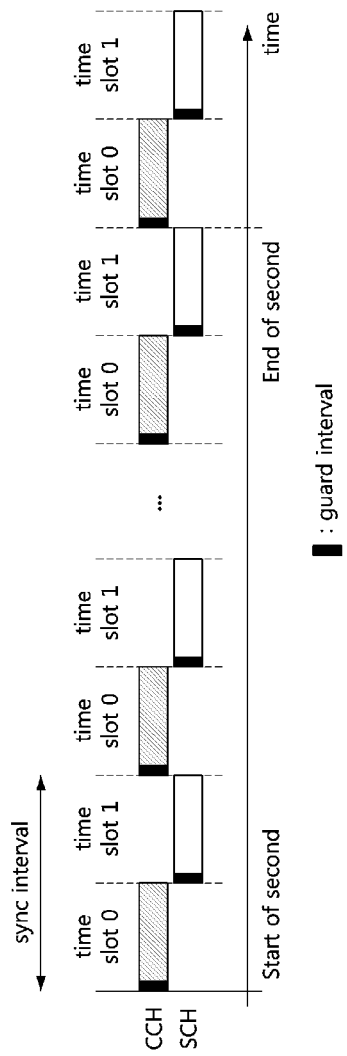
FIG. 5 is a conceptual diagram illustrating an exemplary embodiment of a sync interval in WAVE communication.

FIG. 5 is a conceptual diagram illustrating an exemplary embodiment of a sync interval in WAVE communication. As shown in FIG. 5, communication nodes using WAVE communication have a mechanism to access one or more channels in a specific time period (i.e., sync interval). For example, a communication node may be configured to access one channel among a control channel (CCH) or a service channel (SCH). The communication node may be configured to access a CCH or an SCH by changing an access target channel. A method of changing a channel according to an altering access mode (which will be described later) may be operated based on a sync interval, which is a time interval synchronized to a standard time used in the WAVE communication.

One sync interval may include a CCH interval during which a signal is transmitted and received through a CCH and an SCH interval during which a signal is transmitted and received through an SCH. During the CCH interval, communication nodes may be configured to transmit and receive messages via the CCH. A communication node participating in an application service may be configured to switch an access target channel to the SCH during the SCH interval. During the SCH interval, the communication node may be configured to transmit and receive messages with other communication nodes belonging to the V2X communication network via the SCH. Each of the CCH interval and the SCH interval may include a guard interval. Each interval may start with the guard interval. The guard interval may begin at each of the CCH interval and the SCH interval. In the guard interval, the communication node may be configured to switch the access target channel and acquire synchronization. The communication node that is switching the access target channel in the guard interval may not receive a packet.

As defined in the IEEE 1609.4, the CCH interval may be 50 ms and the SCH interval may be 50 ms. The guard interval included in each interval (CCH interval or SCH interval) may be 4 ms. Accordingly, in each interval (CCH interval or SCH interval), a time during which the communication node may use a channel may be 46 ms (i.e., 50 ms−4 ms), which is a time excluding the guard interval. When the channel access mode is the altering access mode, each communication node may be configured to synchronize the channel interval and the sync interval by a standard time such as universal time coordinated (UTC). For example, the communication node may be configured to perform synchronization of the channel interval and the sync interval every 1 pulse per second (PPS) interval based on the UTC.

Figure 6:
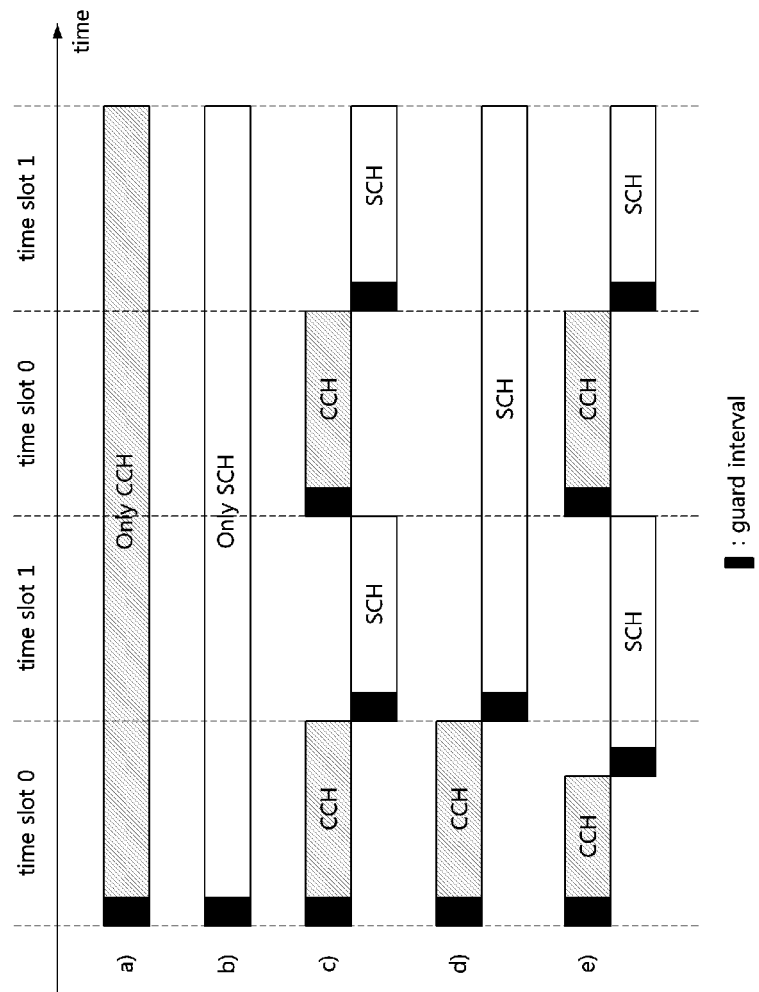
FIG. 6 is a conceptual diagram illustrating an exemplary embodiment of channel access modes of a communication node.

FIG. 6 is a conceptual diagram illustrating an exemplary embodiment of channel access modes of a communication node. As shown in FIG. 6, different MAC layers for one physical layer may divide time, and each of the MAC layers may alternately use a CCH and a different channel access mode in each allocated time slot. The channel access modes of the communication node of FIG. 6 may be classified into a continuous mode (a and b), an altering mode (b), an extended mode (d), and immediate mode (e).

The continuous mode may be a mode in which each communication node operates irrespective of a time division reference such as a time slot, a CCH interval, or an SCH interval in FIG. 6. When the channel access mode is the continuous mode, the communication node may be configured to continuously receive operational information of the channel through a designated CCH or a designated SCH. In addition, the communication node may be configured to transmit and receive messages with other communication nodes in the V2X communication system.

When the channel access mode is the altering mode, each communication node may be configured to receive operational information of the channel during the CCH interval. Additionally, when the channel access mode is the altering mode, each communication node may be configured to perform a negotiation procedure for transmitting and receiving messages with other communication nodes of the V2X communication system during the CCH interval. When the channel access mode is the altering mode, each communication node may be configured to transmit and receive a message with a service provider and a user during the SCH interval. When the channel access mode is the altering mode, the communication node may be configured to communicate through the CCH and SCH alternately during the configured CCH interval and SCH interval.

When the channel access mode is the extended mode, the communication node may be configured to alternate the CCH interval and the SCH interval as in the altering mode. However, service or information exchange of the SCH interval may also be performed in the CCH interval. When the channel access mode is the extended mode, the communication node may be configured to transmit and receive control information during the CCH interval. When the communication node enters the SCH interval, the communication node may be configured to maintain the SCH interval until message transmission and reception ends.

When the channel access mode is the immediate mode, the communication node may be configured to transmit and receive messages with other communication nodes in the V2X communication network, such as in the altering mode or the extended mode. However, when a negotiation for information exchange is completed during the CCH interval, the communication node may be configured to transmit and receive messages by switching a channel immediately to a designated SCH instead of waiting for termination of the CCH interval.

Figure 7:
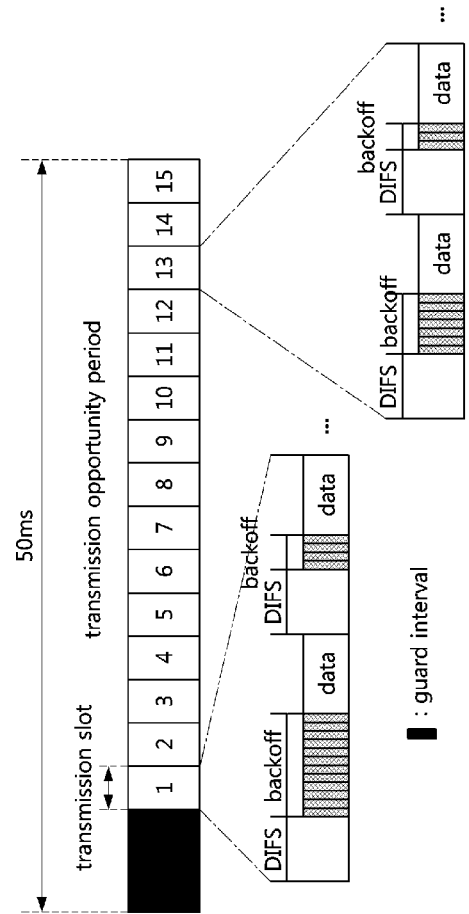
FIG. 7 is a conceptual diagram illustrating an exemplary embodiment of a channel interval including a plurality of transmission slots in a WAVE communication.

FIG. 7 is a conceptual diagram illustrating an exemplary embodiment of a channel interval including a plurality of transmission slots in a WAVE communication. As shown in FIG. 7, a channel interval (CCH interval or SCH interval) may include a transmission opportunity period which is a period excluding a guard interval. The transmission opportunity period may include a plurality of transmission slots. According to the exemplary embodiment of FIG. 7, the transmission opportunity period may include 15 transmission slots.

In each transmission slot, the communication node may be configured to perform channel access. The communication node may be configured to select an arbitrary transmission slot included in the transmission opportunity period. Each transmission slot may be indicated by a slot index. The communication node may be configured to select one of indexes of available transmission slots included in the transmission opportunity period. For example, the communication node may be configured to select an arbitrary number from 1 to 15.

The communication node may be configured to perform channel access in a transmission slot having an arbitrary number selected as a slot index. All communication nodes of the communication network may be configured to perform synchronization at the guard interval, and simultaneously identify starting time points of the transmission slots. Thus, the communication nodes in the communication network may be configured to attempt channel access at the same time point. When a channel sensed by the communication node is in an idle state, if a signal is transmitted after a DIES elapses, a collision with a signal transmitted by another communication node may occur.

Therefore, the communication nodes attempting to transmit at the starting time point of the transmission slot may be configured to perform a random backoff after a DIES elapses to transmit data. The communication nodes transmitting signals after the starting time point of the transmission slot may be configured to operate based on whether the channel is in an idle state, similarly to the usual WLAN channel access.

The operation of the present exemplary embodiment may be applied when data generated while using another channel is to be transmitted through a present channel by switching to the present channel. For example, when data to be transmitted through the CCH is generated while operating in the SCH interval, the communication node may be configured to transmit the data during a time when the communication node operates in the CCH interval after being switched to the CCH interval. For example, if the time point at which the communication node generates data is a time that corresponds to a transmission slot 12 of the SCH interval, the communication node may be configured to perform transmission in a corresponding transmission slot 12 of the CCH interval after switching to the CCH interval.

Figure 8:
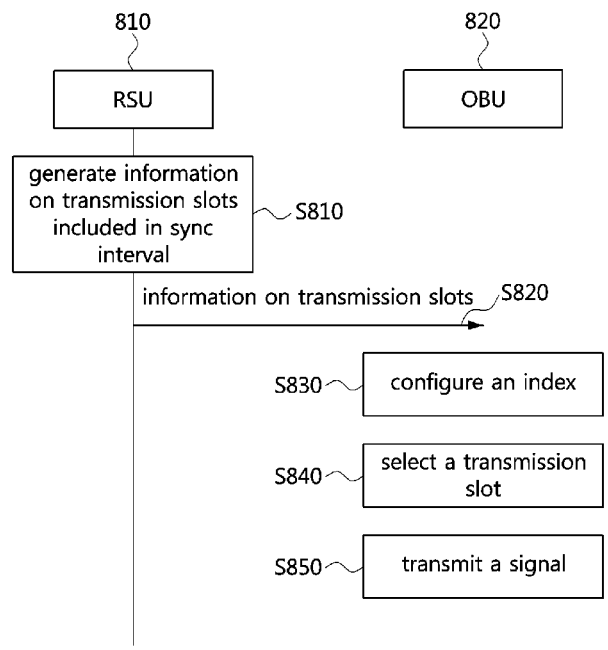
FIG. 8 is a sequence chart illustrating an exemplary embodiment of a CSMA/CA-based message transmission method in a WLAN system.

FIG. 8 is a sequence chart illustrating an exemplary embodiment of a CSMA/CA-based message transmission method in a WLAN system. As shown in FIG. 8, a V2X communication system may include a road side unit (RSU) 810 and an on board unit (OBU) 820. Although only one OBU 820 is shown in FIG. 8, the V2X communication system may further include a plurality of OBUs.

The RSU 810 may be configured to generate information regarding transmission slots included in a sync interval (S810). For example, the RSU 810 may configure the number of the transmission slots included in the sync interval in the step S810. First, the size of each transmission slot for transmitting a message may be configured according to Equation 1 based on OFDM PHY parameters.

$$TX_{Total} = 32\ \mu s(\text{Preamble}) + 8\ \mu s(\text{SIGNAL}) + \qquad \text{Equation 1}$$
$$8\ \mu s\ (T_{SYM}) \times \left\lceil \frac{16 + 8 \times \text{LENGTH} + 6}{N_{DBPS}} \right\rceil$$

As defined in the IEEE 1609.4, the CCH interval and the SCH interval may be 50 ms, respectively, and the guard interval may be 4 ms. Thus, the time for actually transmitting a message may be 46 ms. The number of transmission slots included in the sync interval may be calculated by Equation 2 below.

$$N_{max-slot} = \left\lfloor \frac{46\ \text{ms}}{TX_{Total} + AIFS[AC] + \text{Max} \cdot Backofftime} \right\rfloor \qquad \text{Equation 1}$$

In Equation 2, AIFS [AC] may be an AIFS value according to an AC, and Max.Backofftime may indicate the maximum value of a backoff time according to the AC. AIFS[AC] and Max.Backofftime may be defined according to Table 3 below.

TABLE 3

| AC | AIFS(µs) | Maximum backoff time(µs) |
|---|---|---|
| AC_BK | 149 | 195 |
| AC_BE | 110 | 195 |
| AC_VI | 71 | 105 |
| AC_VO | 58 | 45 |

Referring to Equations 1 and 2, the RSU 810 may be configured to determine the number of transmission slots included in the sync interval based on the OFDM parameters and the EDCA parameters. The RSU 810 may be configured to determine the optimal number of transmission slots included in the sync interval by further reflecting the characteristics of the V2X network. For example, the RSU 810 may be configured to optimize the number of transmission slots included in the sync interval by further reflecting the number of OBUs ($N_{vehicle}$) located within a preconfigured range from the RSU 810, a transmission rate of messages transmitted and received by each communication node, or the number of messages ($N_{message}$) transmitted and received by the communication nodes.

The RSU 810 may be configured to transmit a message including information regarding the transmission slots included in the sync interval to the OBU 820 (S820). The RSU 810 may be configured to transmit the message including the information regarding the transmission slots to the OBU 820 through a control channel (CCH) included in the sync interval (820). The message including the information regarding the transmission slots may be a message in form of a wireless access for vehicle environment (WAVE) service advertisement (WSA). The OBU 820 may be configured to receive the message including the information regarding the transmission slots included in the sync interval from the RSU 810 (S820). The OBU 820 may be configured to obtain the information regarding the transmission slots included in the sync interval from the received message.

The OBU 820 may configure one index based on the obtained information regarding the transmission slots included in the sync interval (S830). For example, the OBU 820 may be configured to obtain information regarding the number N of transmission slots included in the sync interval. The OBU 820 may configure an integer among integers from 1 to N as an index. One index configured by the OBU 820 may indicate a transmission slot among the transmission slots included in the sync interval, and the OBU 820 may be configured to attempt channel access in the transmission slot indicated by the configured index.

In other words, the OBU 820 may be configured to determine one transmission slot to transmit a message among the transmission slots included in the sync interval based on the configured index. The operation of determining one transmission slot by the OBU 820 may include the following operations.

Figure 9:
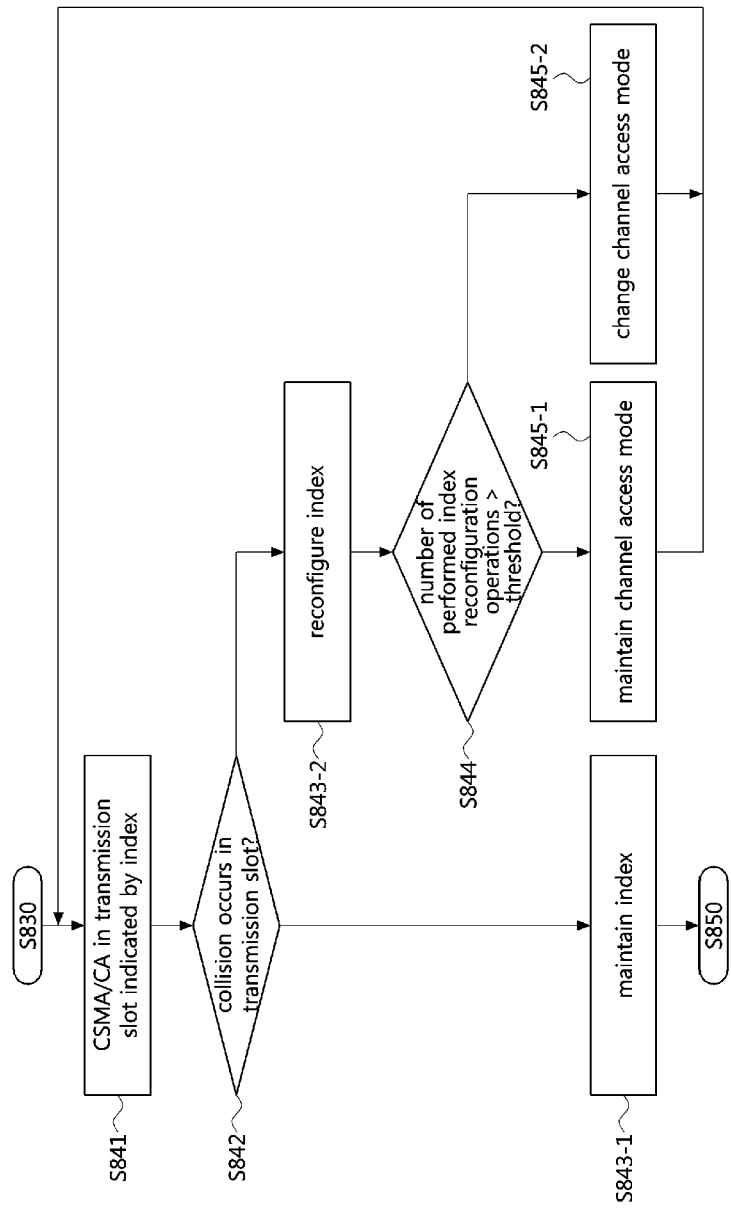
FIG. 9 is a flowchart illustrating an exemplary embodiment of a method of determining a transmission slot for transmitting a message by a communication node of a WLAN system.

FIG. 9 is a flowchart illustrating an exemplary embodiment of a method of determining a transmission slot for transmitting a message by a communication node of a WLAN system. As shown in FIG. 9, the OBU 820 may configure one index in the step S830 and perform a DCF in the transmission slot indicated by the configured index. Specifically, the OBU 820 may be configured to perform a CSMA/CA operation in the transmission slot indicated by the index configured in the step S830 (S841).

The OBU 820 may be configured to determine whether there is a collision between messages in the transmission slot indicated by the index based on a result of the CSMA/CA operation performed in the step S841 (S842). The OBU 820 may be configured to determine whether to change the index based on whether a collision occurs in the transmission slot. For example, when a collision between messages does not occur in the transmission slot indicated by the index, the OBU 820 may be configured to maintain the index determined in the step S830 (S843-1).

On the other hand, when a collision occurs between messages in the transmission slot indicated by the index, the OBU 820 may be configured to determine that another communication node also transmits a message through the transmission slot. In particular, the OBU 820 may be configured to reconfigure the index determined in the step S830 (S843-2). For example, the OBU 820 may be configured to reconfigure an integer among integers from 1 to N as a new index. However, the OBU 820 performing the index reconfiguration operation may be configured to reconfigure the index among values except the index value configured in the step S830 (S843-2).

The OBU 820 may be configured to count the number of performing the index reconfiguration operations. The OBU 820 may be configured to compare the number of the performed index reconfiguration operations with a preconfigured threshold (S844). The OBU 820 may be configured to determine whether to change the channel access mode based on the comparison result of the step S844. The channel access mode may be one of continuous mode, altering mode, extended mode, and immediate mode, as shown in FIG. 7. For example, the channel access mode may be set to the altering mode.

The OBU 820 determining that the number of the performed index reconfiguration operations is less than the preconfigured threshold in the step S844 may be configured to maintain the current channel access mode. On the other hand, The OBU 820 determining that the number of the performed index reconfiguration operations is equal to or greater than the preconfigured threshold in the step S844 may be configured to change the channel access mode. For example, the OBU 820 may be configured to change the channel access mode from the altering mode to the immediate mode.

When the index reconfiguration and the channel access mode change are completed, the OBU 820 may be configured to perform a CSMA/CA operation in a transmission slot indicated by the reconfigured index. When a collision is not detected in the transmission slot indicated by the reconfigured index, the OBU 820 may be configured to maintain the reconfigured index. When a collision is detected in the transmission slot indicated by the reconfigured index, the OBU 820 may be configured to reconfigure the index again.

Referring back to FIG. 8, the OBU 820 may be configured to select one transmission slot based on the index configured in the step S830 (S840). The index configured in the step S830 and an index of the selected transmission slot may be the same, but may be different from each other. In other words, the selected transmission slot may be determined by a predetermined rule using the index configured in the step S830. The OBU 820 may be configured to transmit a message to other communication nodes of the V2X communication network through the transmission slot determined in the step S840 (S850).

Figure 10:
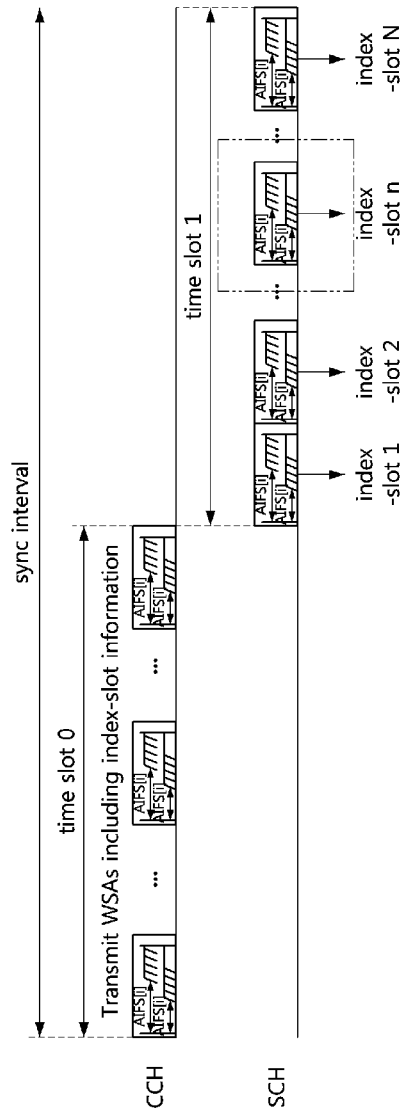
FIG. 10 is a conceptual diagram illustrating a first exemplary embodiment of a CSMA/CA based message transmission result in a WLAN system.

FIG. 10 is a conceptual diagram illustrating a first exemplary embodiment of a CSMA/CA based message transmission result in a WLAN system. As shown in FIG. 10, a sync interval may include a first time slot and a second time slot. The first time slot may include a CCH interval, and the second time slot may include a SCH interval. The first time slot may include a plurality of transmission slots, and the second time slot may also include a plurality of transmission slots. An index may be set for each of the plurality of transmission slots included in the second time slot.

The V2X communication system may include an RSU and an OBU, and the RSU may be configured to transmit a WSA including information regarding the transmission slots of the sync interval in the first time slot to the OBU through a CCH. The OBU may be configured to determine one index n as shown in FIGS. 9 to 10. Specifically, the OBU may be configured to set a range of indexes based on the information regarding the transmission slots of the sync interval (e.g., information regarding the number of transmission slots), and determine an integer among integers included in the set range of indexes as the index n.

The OBU may be configured to attempt to transmit a message in the one transmission slot (i.e., n-th transmission slot) indicated by the index n determined among the transmission slots included in the second time slot of the sync interval. The OBU may be configured to perform a CSMA/CA operation to avoid collision with a message transmitted by another OBU in the n-th transmission slot. If no collision is determined to occur as a result of the CSMA/CA operation, the OBU may be configured to transmit a message in the n-th transmission slot.

According to FIG. 10, when a plurality of OBUs attempt to access a channel in the second time slot, each of the OBUs may be configured to attempt to access a channel based on an index determined arbitrarily. Therefore, the CSMA/CA based message transmission method according to an exemplary embodiment of the present disclosure may reduce contention for channel access between the OBUs.

Figure 11:
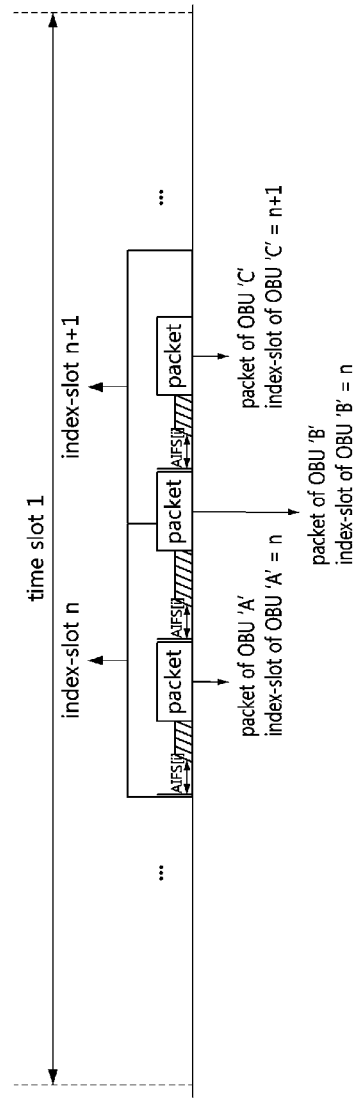
FIG. 11 is a conceptual diagram illustrating a second exemplary embodiment of a CSMA/CA based message transmission result in a WLAN system.

FIG. 11 is a conceptual diagram illustrating a second exemplary embodiment of a CSMA/CA based message transmission result in a WLAN system. As shown in FIG. 11, different OBUs may be configured to transmit messages through transmission slots included in one time slot (e.g., the second time slot of FIG. 11). Each of the OBUs may configure an arbitrary index. For example, the first OBU may configure n as an arbitrary index, the second OBU may configure n as an arbitrary index, and the third OBU may configure n+1 as an arbitrary index.

Each of the OBUs may be configured to select a transmission slot to transmit a message based on the configured index. For example, the first OBU may be configured to perform a CSMA/CA operation in the n-th transmission slot, and the second OBU may also be configured to perform a CSMA/CA operation in the n-th transmission slot. The EDCA parameters of the first OBU and the EDCA parameters of the second OBU may be configured differently from each other. Therefore, the message transmission priorities of the first OBU and the second OBU may be different from each other. Referring to FIG. 12, the first OBU may have a higher priority than the second OBU, and thus the first OBU may be configured to transmit a message through the n-th transmission slot.

The second OBU may be configured to perform a CSMA/CA operation in the n-th transmission slot. When the n-th transmission slot remains idle during an AIFS after the message transmission of the first OBU is completed, the second OBU may be configured to transmit a message through the n-th transmission slot. However, the second OBU may be configured to transmit a message using only a part of the n-th transmission slot, and thus the second OBU may be configured to transmit only a part of the message through the n-th transmission slot. If the n-th transmission slot is terminated before transmission of the message is completed, the second OBU may be configured to further transmit the message through a transmission slot after the n-th transmission slot. For example, the second OBU may be configured to transmit a part of the message through the n-th transmission slot and transmit the remaining part of the message through a (n+1)-th transmission slot.

The third OBU may be configured to perform a CSMA/CA operation in the (n+1)-th transmission slot. When the second OBU transmits a message through the (n+1)-th transmission slot, the third OBU may not perform a signal transmission operation by detecting a collision in the (n+1)-th transmission slot. When the (n+1)-th transmission slot remains idle during an AIFS after the message transmission of the second OBU is completed, the third OBU may be configured to transmit a message through the (n+1)-th transmission slot. The third OBU may be configured to transmit a message using only a part of the (n+1)-th transmission slot.

Alternatively, the third OBU may be configured to transmit only a part of the message through the (n+1)-th transmission slot. When the n-th transmission slot is terminated before the transmission of the message is completed, the third OBU may be configured to transmit a part of the message through the (n+1)-th transmission slot and transmit the remaining part of the message through a (n+2)-th transmission slot.

The exemplary embodiments of the present disclosure may be implemented as program instructions executable by a variety of computers and recorded on a non-transitory computer readable medium. The non-transitory computer readable medium may include a program instruction, a data file, a data structure, or a combination thereof. The program instructions recorded on the non-transitory computer readable medium may be designed and configured specifically for the present disclosure or can be publicly known and available to those who are skilled in the field of computer software.

Examples of the non-transitory computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the exemplary embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. An operation method of a first communication node for transmitting a message in a vehicle-to-everything (V2X) communication network, comprising:
   receiving, by a controller, information regarding a time period including a plurality of transmission slots from a second communication node;
   selecting, by the controller, one transmission slot included in the time period based on a first index configured based on the information regarding the time period; and
   transmitting, by the controller, a message through the one transmission slot,
   wherein the information regarding the time period includes information regarding a number of the plurality of transmission slots included in the time period, wherein the selecting of the one transmission slot includes detecting a collision between messages in the transmission slot indicated by the first index by performing a carrier sense multiple access/collision avoidance (CSMA/CA) operation in the transmission slot indicated by the first index, and wherein when the collision is detected as a result of the CSMA/CA operation, reconfiguring a second index except the first index.

2. The operation method according to claim 1, wherein the number of the plurality of transmission slots included in the time period is configured based on at least one of a number of communication nodes located within a preconfigured distance from the second communication node, a data transmission rate of the message, and a number of messages transmitted during the time period.

3. The operation method according to claim 1, wherein the receiving of the information regarding the time period includes receiving a wireless access for vehicle environment (WAVE) service advertisement (WSA) including the information regarding the time period through a control channel (CCH).

4. The operation method according to claim 1, wherein the selecting of the one transmission slot further includes, when a number of performing the reconfiguring of the second index exceeds a preconfigured threshold, changing a channel access mode of the time period.

5. The operation method according to claim 1, wherein the transmitting of the message further includes, when the transmission of the message is completed in the one transmission slot, maintaining the first index of the one transmission slot after transmitting the message through the one transmission slot.

6. The operation method according to claim 1, wherein the transmitting of the message further includes, when the one transmission slot is terminated before the transmission of the message is completed, transmitting the message additionally through a transmission slot after the one transmission slot.

7. A second communication node for transmitting a message in a vehicle-to-everything (V2X) communication network, comprising:
a processor;
a memory configured to store at least one instruction executable by the processor; and
at least one antenna configured to perform signal transmission and reception based on an operation of the processor,
wherein when executed by the processor, the at least one instruction is configured to:
generate information regarding transmission slots for granting transmission opportunities to first communication nodes;
generate information regarding a time period including a plurality of transmission slots based on the information regarding the transmission slots; and
transmit a message including the information regarding the time period to the first communication nodes,
wherein the information regarding the time period includes information on a number of the plurality of transmission slots included in the time period, and
wherein the number of the plurality of transmission slots included in the time period is configured based on a number of the first communication nodes located within a preconfigured distance from the second communication node and a number of messages transmitted by the first communication nodes during the time period.

8. The second communication node according to claim 7, wherein the second communication node is a road side unit (RSU), and the first communication nodes are on board units (OBUs).

9. The second communication node according to claim 7, wherein the at least one instruction is further configured to transmit a wireless access for vehicle environment (WAVE) service advertisement (WSA) including the information on the time period through a control channel (CCH).

10. A first communication node for transmitting a message in a vehicle-to-everything (V2X) communication network, comprising:
a processor;
a memory configured to store at least one instruction executable by the processor; and
at least one antenna configured to perform signal transmission and reception based on an operation of the processor,
wherein when executed by the processor, the at least one instruction is configured to:
receive information regarding a time period including a plurality of transmission slots from a second communication node;
select one transmission slot included in the time period based on a first index configured based on the information regarding the time period; and
transmit a message through the one transmission slot,
wherein the information regarding the time period includes information regarding a number of the plurality of transmission slots included in the time period,
wherein the at least one instruction is further configured to detect a collision between messages in the transmission slot indicated by the first index by performing a carrier sense multiple access/collision avoidance (CSMA/CA) operation in the transmission slot indicated by the first index, and reconfigure a second index except the first index when the collision is detected as a result of the CSMA/CS operation.

11. The first communication node according to claim 10, wherein the number of the plurality of transmission slots included in the time period is configured based on at least one of a number of communication nodes located within a preconfigured distance from the second communication node, a data transmission rate of the message, and a number of messages transmitted during the time period.

12. The first communication node according to claim 10, wherein the at least one instruction is further configured to receive a wireless access for vehicle environment (WAVE) service advertisement (WSA) including the information on the time period through a control channel (CCH).

13. The first communication node according to claim 10, wherein the at least one instruction is further configured to, when a number of performing the reconfiguring of the second index exceeds a preconfigured threshold, change a channel access mode of the time period.

14. The first communication node according to claim 10, wherein the at least one instruction is further configured to, when the transmission of the message is completed in the one transmission slot, maintain the first index of the one transmission slot after transmitting the message through the one transmission slot.

15. The first communication node according to claim 10, wherein the at least one instruction is further configured to, when the one transmission slot is terminated before the transmission of the message is completed, transmit the message additionally through a transmission slot after the one transmission slot.

* * * * *